United States Patent [19]

Merkle et al.

[11] Patent Number: 4,902,941
[45] Date of Patent: Feb. 20, 1990

[54] DRIVE MOTOR FOR INFORMATION-STORAGE-DISK DEVICES

[75] Inventors: Alfred Merkle, St. Georgen; Georg Moosmann, Pennenbronn; Rolf Müller, St. Georgen, all of Fed. Rep. of Germany

[73] Assignee: Papst-Motoren GmbH & Co KG, St. Georgen, Fed. Rep. of Germany

[21] Appl. No.: 111,366

[22] Filed: Oct. 20, 1987

Related U.S. Application Data

[63] Continuation of Ser. No. 812,273, Dec. 2, 1985, Pat. No. 4,701,653, which is a continuation of Ser. No. 517,793, Jul. 27, 1983, abandoned.

[30] Foreign Application Priority Data

Jul. 27, 1982 [DE] Fed. Rep. of Germany ....... 3227946
Jul. 27, 1982 [DE] Fed. Rep. of Germany ....... 3227947
Jul. 27, 1982 [DE] Fed. Rep. of Germany ....... 3227948

[51] Int. Cl.⁴ .................. H02K 1/24; G11B 19/22
[52] U.S. Cl. ........................... 310/216; 29/598; 310/256; 310/261
[58] Field of Search ............. 29/598; 310/42, 186, 310/216, 218, 256, 261

[56] References Cited

U.S. PATENT DOCUMENTS 3,527,969 9/1970 Papst .................. 310/67 R
4,503,368 3/1985 Sakamoto ................ 310/216
4,701,653 10/1987 Merkle et al. ............ 310/152

FOREIGN PATENT DOCUMENTS 850258 12/1939 France .................. 310/156

*Primary Examiner*—Patrick R. Salce
*Assistant Examiner*—D. L. Rebsch
*Attorney, Agent, or Firm*—Theodore J. Koss, Jr.

[57] ABSTRACT

A drive unit for direct drive of an information-storage disk comprises a brushless dc external-rotor motor having a permanent-magnet rotor magnet arrangement of considerably reduced axial length. Electrostatic charge is removed from the rotor shaft by a metallic spring element which engages the shaft periphery from within the interior of the rotor housing. An electromagnetic braking arrangement is located interiorly of the housing. The packet of stator plates for the stator has an axial length shorter than that of the rotor magnet arrangement, but is provided at its axial end faces with skirted-rim flux-conducting elements whose peripheral skirt portions form useful-air-gap extensions in cooperation with the rotor magnet arrangement. The stator plate packet and associated skirted-rim flux-conducting elements may have cut-outs defining salient-pole structure, and the skirt portions of the flux-conducting elements be then provided with cut-outs at their leading ends serving to produce a reluctance torque component which, during rotor rotation, is shifted in time relative to the electromagnetic torque component attributable to the salient-pole configuration. The portion of the rotor structure which supports a disk has an annular recess accommodating a disk-holding magnet whose upper surface is slightly recessed relative to an annular magnetically conductive disk-supporting ridge of the rotor, the cross-sectional shape of the ridge being such as to establish a magnetic disk-holding force of exactly predetermined character, despite tolerance-range variation of the coercive force of the holding magnet employed.

37 Claims, 5 Drawing Sheets

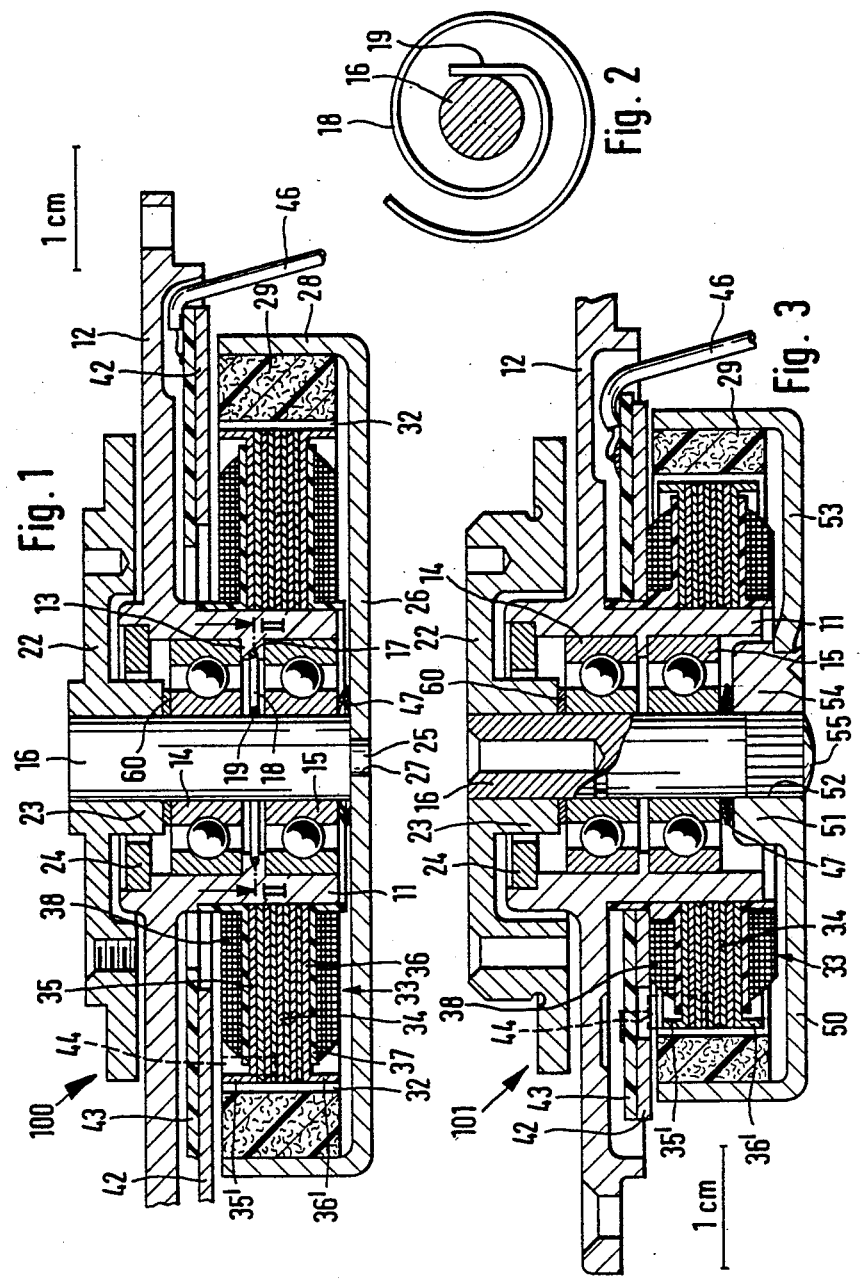

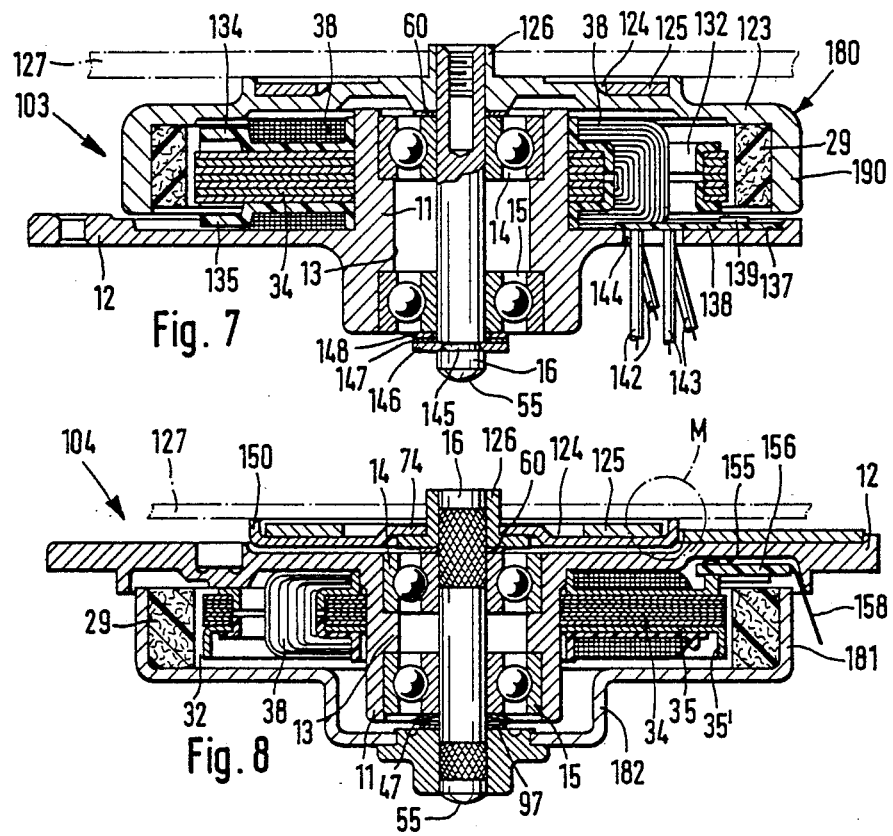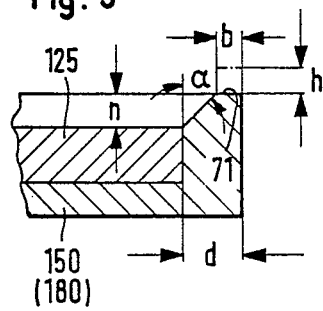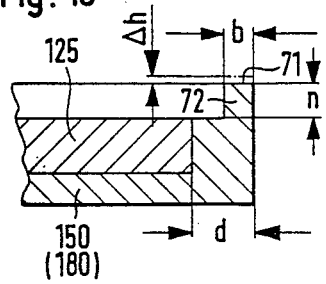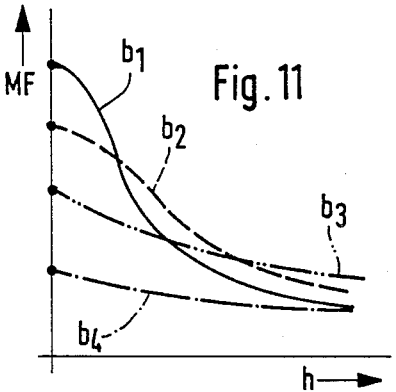

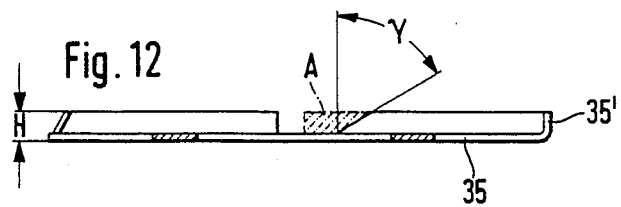
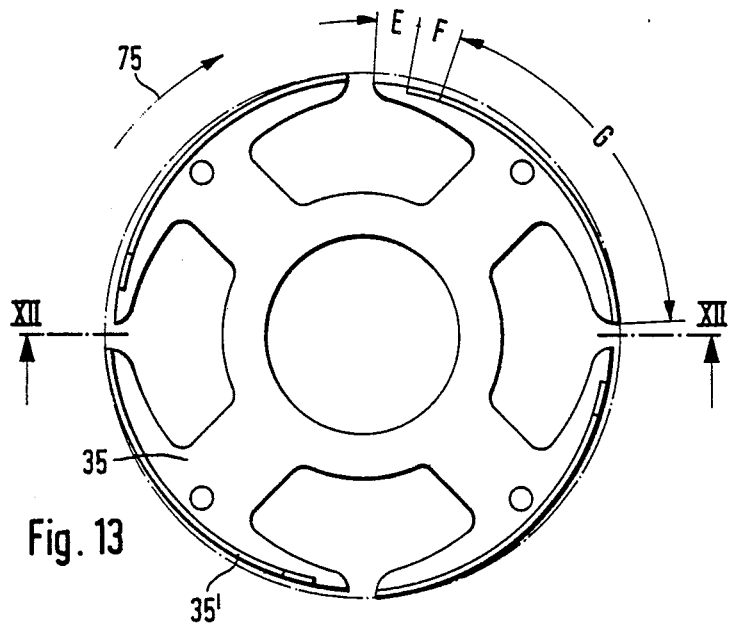
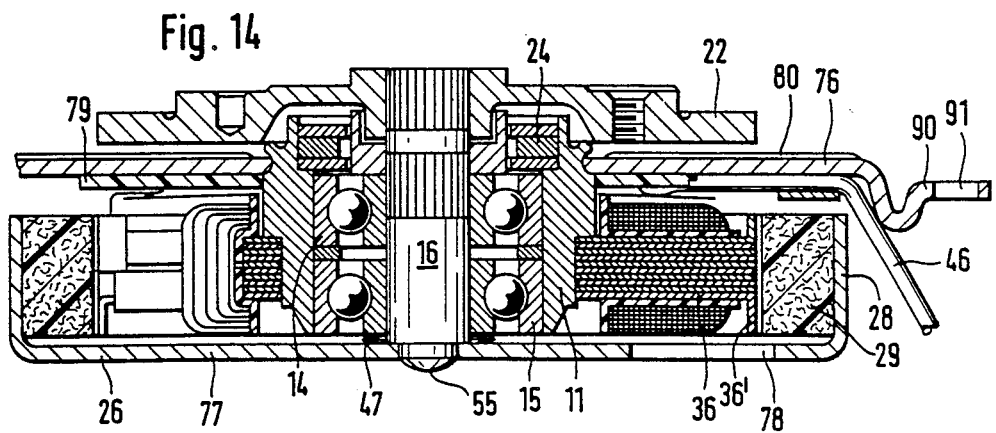

DRIVE MOTOR FOR INFORMATION-STORAGE-DISK DEVICES

This application is a continuation of application Ser. No. 812,273 filed Dec. 2, 1985, now U.S. Pat. No. 4,701,653, which in turn was a continuation of application Ser. No. 517,793 filed Jul. 27, 1983 now abandoned.

BACKGROUND OF THE INVENTION

The invention concerns drive arrangements for signal-processing devices, especially information-storage-disk devices. Such drive arrangements may comprise a brushless dc motor having a permanent-magnet external rotor serving for direct-drive of an information-storage disk, the internal stator of the motor comprising a carrier structure which accommodates roller bearing units for the rotor shaft, the carrier structure being provided with a mounting portion for mounting the motor as a whole. A packet of stator plates is provided radially outward of the carrier structure, and the rotor shaft is journalled in the roller bearing units within the carrier structure. Such an arrangement is described in U.S. patent application Ser. No. 440,537, commonly owned, the disclosure of which is incorporated herein by reference.

Motors of this or similar types are used as drives in high-precision devices and exhibit many outstanding characteristics. However, for many types of applications, motors of more compact construction would be required.

SUMMARY OF THE INVENTION

It is therefore a main object of the invention to provide motors of the above or similar types which are of improved compactness of construction, particularly with respect to their axial length.

In this connection, the invention aims to improve axial-length compactness by improvement of motor grounding and braking structure while maintaining output power as high as possible.

According to one concept of the invention, a metallic element is secured in the carrier structure of the motor and bears against the rotor shaft in electrically conductive engagement therewith, to maintain substantially equal potential on the carrier structure and the rotor shaft. This reduces space consumption compared to the known technique of providing a sliding electrical contact engaging the rotor shaft from the exterior of the motor, and likewise eliminates certain assembly and factory-performed adjustment procedures.

According to a further concept of the invention, the electromagnetic braking arrangement of such a motor is mounted on the aforementioned carrier structure and located within the interior of the rotor housing.

A further concept of the invention is applicable when the stator is so configured and provided with a winding as to produce a periodic stator field yielding an electromagnetic torque component, but in addition thereto an auxiliary reluctance torque component which, alternately, tends to advance and retard rotor rotation, with the reluctance torque component being shifted in time relative to the electromagnetic torque component. When the motor is provided with this action, decrease of axial length can be achieved in a novel way. The axial length of the stator plate packet can be made considerably shorter than that of the rotor magnet arrangement, with the stator plate packet being provided on one or both its axial end faces with one or more flux-conducting elements, of an outline corresponding to that of the stator plate packet, the flux-conducting elements having at their rims axially extending skirt portions. The skirt portions extend axially, generally parallel to the inner periphery of the rotor magnet arrangement, to form a useful air gap which serves as a continuation or extension of the air gap formed by the periphery of the stator plate packet proper. The skirted-rim flux-conducting elements, then, can be provided with cut-outs providing additional stator-geometry irregularities which contribute corresponding reluctance torque components.

In this way, without detrimental influence upon motor power or precision of operation, it becomes possible to achieve a rather short axial length. The motor is preferably a collectorless D.C. motor having a permanent-magnet external rotor comprised of a rotating rotor housing accommodating, for example, a one-piece permanent-magnet ring, or a permanent-magnet strip which has been bent to form a ring, being radially polarized and having a plot of induction versus angular location along the rotor exhibiting generally the shape of a trapezoid-wave curve. For the permanent rotor magnet arrangement, most preferred is the use of a so-called rubber magnet comprising magnetic material bound together with synthetic plastic material. Such magnets typically consist of mixtures of hard ferrites and elastic material, most especially elastomer-bound barium ferrite. The aforementioned trapezoid-wave-like induction curve of the resulting magnet ring advantageously exhibits very narrow inter-pole or pole-gap transitions. However, other types of permanent magnets may be used, such as cemented-in half shell magnets, etc.

As already stated, it is advantageous to apply the concepts of the invention to a brushless dc motor having a (1- or 2-pulsed) auxiliary reluctance torque. In such case, the magnetic resistance presented by the stator structure of the motor's magnetic circuit varies in dependence upon the angular position of the rotor in such a manner as to yield an auxiliary reluctance torque which is shifted in time relative to the motor's electromagnetic torque component, most especially approximately in phase-opposition thereto. Advantageously in such case, the stator winding, the rotor and the stator iron are designed such that the auxiliary reluctance torque is generated at least during the time intervals during which gaps or reductions occur in the generation of electromagnetic torque, so as to yield in combination with the electromagnetic torque component a net torque which is of improved constancy. Motors which exhibit such a reluctance torque component are disclosed for example in U.S. Pat. Nos. 3,873,897 and 3,840,761, the disclosures of which are incorporated herein by reference, and are particularly simple and inexpensive to produce. Also, they exhibit outstanding operating characteristics and, for a given power, can be of a more compact construction than other motor types.

However, the concepts of the invention are likewise applicable with, for example, three-conductor electronic motors such as disclosed in commonly owned U.S. patent application Ser. No. 210,768, the disclosure of which is incorporated herein by reference.

The no-load speed of such a motor can be on the order of 5800 rpm and its rated speed on the order of e.g. 3600 rpm.

Further objects and advantages of the invention will become apparent from the description of specific embodiments when considered in conjunction with the Figures.

BRIEF DESCRIPTION OF THE DRAWINGS

FIG. 1 depicts a first embodiment of the inventive drive motor unit;

FIG. 2 depicts a detail of the embodiment of FIG. 1, seen along line II—II of FIG. 1;

FIG. 3 depicts a second embodiment;

FIG. 7 depicts a fourth embodiment, in which the bulk of the motor is located above the mounting flange of the motor;

FIG. 8 depicts a fifth embodiment;

FIGS. 9 and 10 depict detail "M" of FIG. 8, depicting two variants therefor, on a scale about five times greater than that of FIG. 8;

FIG. 11 is a plot of magnetic holding force, referred to in connection with the description of FIGS. 7–10;

FIG. 12 is a section taken along line XII—XII of FIG. 13;

FIG. 13 is a plan view which depicts a flux-conducting element generally congruent with the stator plate packet on whose axial end face it is provided; and FIG. 14 depicts a sixth embodiment.

DESCRIPTION OF THE PREFERRED EMBODIMENTS

Figure 4:
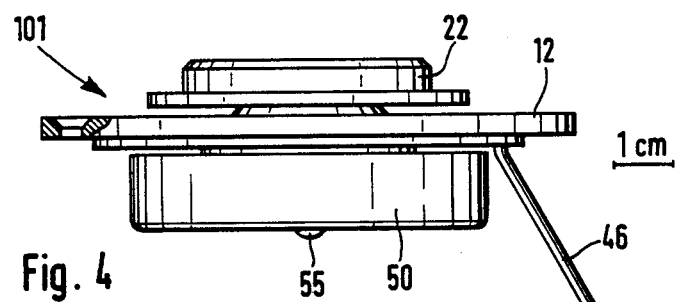
FIG. 4 is a side view of the motor of FIG. 3, depicted at a typical true scale.

In the various Figures, components which are identical or equivalent are denoted by the same reference numerals and usually described but once. It is to be noted that certain elements, appearing in the structures of certain Figures, are evidently to be provided at corresponding locations in the structures of other Figures, but are not repetitively shown therein for the sake of clarity of illustration. The terms "upper", "lower", etc., refer to the orientations of the depicted structures as viewed in the various Figures, except where the contrary is stated or self-evident.

FIG. 1 depicts a brushless dc motor 100 having a carrier member provided with a radial mounting flange 12, which latter mounts the motor as a whole. Advantageously, the carrier structure takes the form of the illustrated carrier pipe 11 and is preferably of one piece with its mounting flange 12, e.g. formed therewith as a cast part. Two roller bearings 14, 15 (preferably ball bearings) are arranged within the carrier pipe 11 and held therein spaced from each other by a radially inward projection 13 of the carrier pipe 11. The roller bearings 14, 15 serve to journal a drive shaft 16. The inner ring of the upper roller bearing 14 is fixedly secured to the shaft 16, e.g., by cementing. The spacing between the midplanes of the bearings 14, 15 corresponds approximately to the diameter of drive shaft 16. The radial inward projection 13 has an annular groove 17 in which is fixedly arranged a spring 18 which extends out therefrom spirally in turns of decreasing radius, the spring 18 having a free end 19 which bears against the periphery of shaft 16 for relative sliding movement. In this fashion the spring 18 serves to conductively connect shaft 16 to carrier pipe 11 and maintain the former at the potential of the latter to prevent undesired build-up of electrostatic charge on shaft 16, (FIG. 2). Spring 18 can for example be made of beryllium bronze. Its use is of great advantage in the illustrated construction but is of similar advantage in motors of other types. Instead of the free end 19 of spring 18 bearing directly against shaft 16, spring end 19 could be provided with a rolling metallic element, although this would of course be more costly.

The inner ring of the lower roller bearing 15 is not secured to shaft 16 but instead is shiftable relative thereto.

Secured to the upper end of shaft 16 is a hub member 22 which serves to accept and transmit rotation to a non-illustrated information-storage disk, such disk having a central aperture of a diameter corresponding to the external diameter of the hub member 22.

Hub member 22 has an inwardly extending axial collar 23 which forms the inner part of a magnetic-fluid seal, the outer part of which is formed by a ring magnet 24. Ring magnet 24 is fixedly inserted in the carrier pipe 11. The magnetic sealing fluid is located between magnet ring 24 and the collar portion 23. This manner of construction is very compact and shortens the axial length of the motor. Alternatively, the shaft 16 itself could directly form the inner part of the magnetic fluid seal. (Such seals are known in the art and commercially termed "ferrofluidic seals".) Such seal prevents dirt particles from migrating out of the bearing system and into the space in which information-storage disks are to be positioned.

The lower end of shaft 16 terminates in a cylindrical portion 25 of reduced diameter. Press-fitted onto the latter is a deep-drawn pan-shaped rotor housing 26 made of a magnetically conductive material. The press-fit serves for centering and proper orientation of the shaft 16 in the rotor housing 26. It is to be noted that the connection between shaft 16 and rotor housing 26 is problematic and cannot be accomplished reliably enough by means of conventional welding techniques. This is because the housing 26 must consist of a material of good magnetic conductivity, whereas the shaft 16 will consists of a non-corroding material. Intimate bonding between rotor housing 26 and reduced-diameter portion 25 of shaft 16 at the seam 27 can be reliably enough achieved only by means of laser-beam welding.

Inserted within the outer peripheral wall 28 of rotor housing 26 is an uninterrupted magnet ring 29, e.g., a "rubber magnet" such as described further above. Depending upon the motor type involved, magnet ring 29 can for example be a four-pole, radially magnetized rotor magnet; preferably a plot of its induction value versus angular position along the circumference of the magnet has a generally trapezoid-wave shape such as disclosed in Federal Republic of Germany patent DBP 23 46 380, the disclosure of which is incorporated herein by reference. Magnet ring 29 is separated by a cylindrical air gap 32 from a stator arrangement 33. The latter includes a packet of stator plates 34, e.g., with four T-arms defined by four cut-outs (cf. FIG. 13), with the axial end faces of the stator plate packet being fitted with skirted-rim elements 35, 36, such as shown in FIG. 13. (In many cases, it suffices to provide only one such element at one axial face of the stator plate packet 34.) The skirts 35', 36' of elements 35, 36 form extensions of the air gap 32, i.e., their radial distance from the inner periphery of magnet ring 29 is identical with the radial distance from the outer periphery of stator plate packet 34 to the inner periphery of magnet ring 29, when both radial distances are considered within one and the same radial-section plane. In this manner, the axial length of the stator plate packet 34 can for example be only half that of the magnet ring 29, with the air gap 32 nevertheless extending along the entire axial length of magnet ring 29, or at least extending along the major part thereof. This structural feature very advantageously serves to make the total axial length of the stator arrangement, as can be seen, rather small.

The axial end faces of the elements 35, 36 are provided with a layer 37 of insulating material upon which stator winding 38 can be wound. Depending upon the type of motor involved, the stator winding may for example be a one-, two- or three-conductor winding.

For magnetic shielding there is secured above magnet ring 29 an annular plate 42 of magnetically conductive material secured to carrier pipe 11, and located directly on the latter is a circuit board 43 on which may be provided (non-illustrated) circuit elements of a control circuit for motor 100, and to which is connected the illustrated Hall-IC 44 which extends axially into a marginal cut-out of the stator plate packet 34. A cable 46 serves for making connection to the circuit elements on circuit board 43.

A dish spring 47 is arranged between the bottom of rotor housing 26 and the inner ring of the roller bearing 15. As stated above, the inner ring of roller bearing 15 is shiftable relative to drive shaft 16, and the dish spring 47 serves to press the roller bearings 14 and 15 towards each other. As will be evident, the illustrated manner of construction yields an extraordinarily short axial length of the motor, good bearing and mounting action, and also good motor characteristics.

FIG. 3 depicts a motor 101 in which the rotor housing is secured to the drive shaft in a different manner. In this second embodiment, the construction of the stator 33, of the magnetic seal 23, 24, of the bearing system 14, 15 and of the carrier pipe 11 with its flange 12 are entirely the same as in the first embodiment, and thus need not be described again. In the embodiment of FIG. 3, the rotor magnet 29 may be somewhat longer in the axial direction than the peripheral skirts 35', 36' of the skirted-rim elements 35, 36.

FIG. 3 depicts, in its left and right halves, two alternative ways of securing the rotor housing to the drive shaft. As shown in the left half of FIG. 3, the rotor housing 50 can be formed of one piece with an inwardly extending axial hub portion 51, which latter is cemented to a roughened end portion of shaft 16 at 52. Alternatively, as shown in the right half of FIG. 3, the rotor housing 53 can be secured to a central bushing 54, the bushing 54 being cemented to the roughened portion of shaft 56. In both cases, compared to FIG. 1 the axial length of the motor is now somewhat greater, by substantially the axial length of the hub portion 51 or the central bushing 54, whose presence requires that the bearings 14 and 15 be upwardly displaced by such axial length, in turn requiring a corresponding increase in the axial length of the hub member 22.

The lower end 55 of shaft 66 is rounded in FIG. 3. A non-illustrated spring contact can mechanically and electrically engage such rounded end, to serve in conventional manner for grounding shaft 16.

FIG. 4 depicts the motor of FIG. 3 at a typical true scale. The motor in question is a high-precision miniature motor whose power consumption is on the order of a few watts.

Advantageously, when assembling the motor 101, firstly the drive shaft 16 together with its hub member 22 are mounted in the carrier pipe 11, with the sealing fluid being filled into the seal 23, 24, and the hub member and shaft are factory-adjusted with respect to axial position in such a manner that the hub member 22 assumes exactly the correct axial height. To this end, use can be made of a compensating washer 60 between the collar portion 23 and the inner ring of the upper roller bearing 14. Thereupon, the dish spring 47, and possibly also a further axial-length compensation washer, is set into place at the lower end of shaft 16. Then the rotor housing 50 or 53 is set into place and the spring means 47 is set to its desired level of spring stress, whereupon the rotor housing is fixedly secured in this position. In this way the roller bearings are pressed towards each other with a spring force such as to ensure quiet running of the rotor.

The same assembly sequence can be employed with respect to the construction depicted in FIG. 1.

As already stated, in the embodiment of FIG. 3 cement is provided at location 52 to secure the rotor housing to the drive shaft; it will be appreciated that this is a particularly simple way of mounting the rotor in place.

Figure 6:
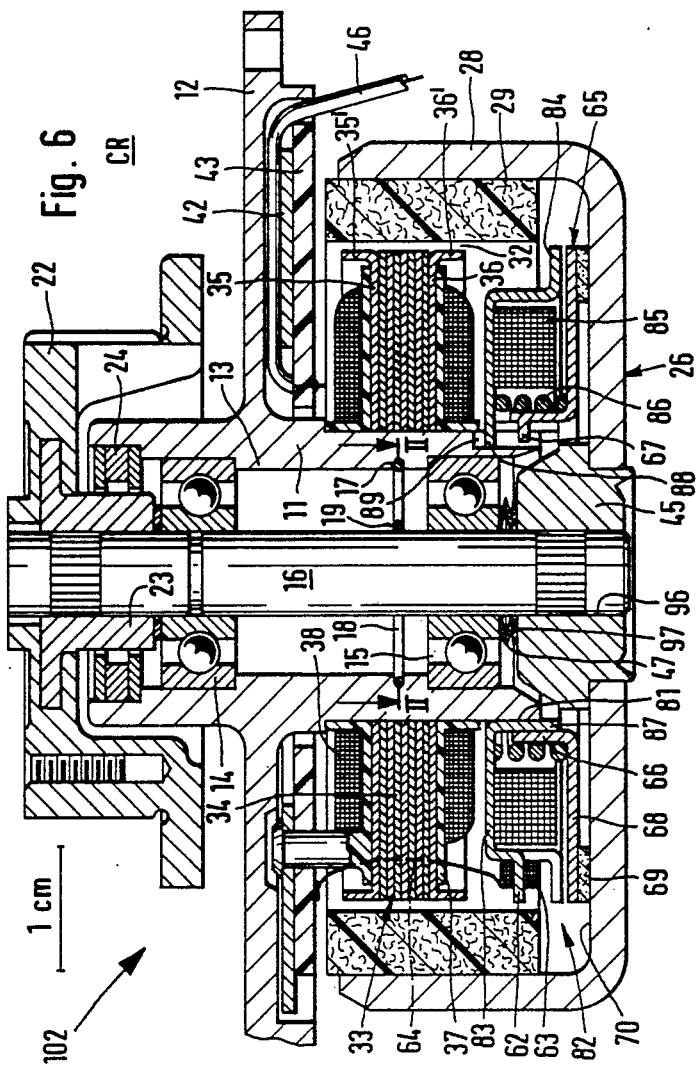
FIG. 6 depicts a third embodiment.

FIG. 6 depicts a third embodiment of the invention, namely a motor 102 provided with a built-in frictional braking arrangement 82.

The rotor housing 26 is secured on a bushing 45 by upsetting the lower end of the latter, and the bushing 45 is secured to the shaft 16 by a cement connection 96. The inner ring of a roller bearing 15 is shiftable with respect to the shaft, and there is provided between this inner ring and the bushing 45 an axial-length compensation washer 97 and a dish spring 47, the latter being set to a predetermined level of stress causing the roller bearings 14 and 15 to be pressed together with a force such as to assure quiet running of the rotor.

A built-in frictional braking arrangement 82 is secured to the lower section of the carrier pipe 11 by means of a cement connection 81. The braking arrangement 82 includes an annular channel-like stator 83 of magnetically conductive material, whose open channel faces down and at its lower rim terminates in a radially outwardly extending flange portion 84 which extends normal to shaft 16. Accommodated within the channel-like stator are an annular coil 85 and a helical compression spring 86. The aforementioned cement connection 81 is located between the carrier pipe 11 and the cylindrical, radially inward portion 87 of the stator 83; this location for the cement connection facilitates exact setting of the height of the stator 83 during assembly. Also facilitating assembly is the provision, on the cylindrical portion 87, of a radially inwardly bent segment 88 which is received in a longitudinal groove 89 in the lower periphery of the carrier pipe 11.

As shown at the left in FIG. 6, a segment 62 of the axially extending outer cylindrical wall of stator 83 is bent radially outwardly towards the rotor magnet 28. Wound on this bent-out tab 62 is a sensor coil 63 which is electrically connected via conductors 64 to a circuit board 43, to which, by means of non-illustrated conductors, the annular coil 85 of the braking arrangement 82 is likewise electrically connected. The sensor coil 63 may be used to produce an rpm signal, a rotor-position signal, etc.

The brake 82 comprises a movable armature 65 which includes an annular member having a radially inner cylindrical portion 66 and, extending radially outwards from the lower edge thereof, an annular flange portion 68. Portion 66 engages and is guided by the radially inner cylindrical wall 87 of the annular channel-like brake stator 83. To prevent improper rotation of armature 66, 68, portion 66 thereof has a radially inwardly bent section 67 which extends into the aforementioned longitudinal groove 89. When the braking arrangement 82 is operative, the underside of the radial flange 68 bears down on and frictionally engages an annular friction layer 69 provided on the interior face of the bottom of rotor housing 26.

When brake 82 is not energized, compression spring 86 presses the brake armature 65 downward against the friction layer 69. In contrast, when annular coil 85 is energized, it pulls armature 65 upwards against the force of spring 86 and disengages the brake 82. In this way, when the motor is disconnected from power the rotor is inherently very quickly braked to a stop, so that reading and writing heads for the information-storage disk driven by the motor will not become damaged.

A comparison with FIG. 4 of Federal Republic of Germany Offenlegungsschrift DE-OS 31 44 629 will make clear that the technique here described could be used in the construction of that publication, to provide that motor with a built-in braking system without increasing its size; the disclosure of that publication is incorporated herein by reference. Thus, with the present feature of this invention one can achieve a very compact motor construction, as may be seen in present FIG. 6 from the "1 cm" indication of scale.

FIG. 7 depicts a fourth embodiment of the invention, namely a brushless dc motor 103 having a carrier pipe 11 with a mounting flange 12. Two roller bearings 14, 15 (preferably ball bearings) mount a drive shaft 16 and are located within the carrier pipe 11 held spaced from each other by a radially inward annular projection 13 of the carrier pipe. The inner ring of the upper roller bearing 14 is fixedly connected to shaft 16, e.g. by cementing. The axial distance between the median planes of the two roller bearings corresponds approximately to the diameter of shaft 16. Secured to the upper end of shaft 16 is a somewhat pan-shaped rotor housing 180 of magnetically conductive material, in whose downwardly extending peripheral wall 190 is inserted a four-pole, radially magnetized rubber magnet 29. A plot of the radial magnetization of magnet 29 versus circumferentially successive locations thereon has a trapezoid-wave shape such that the polarity transitions proceeding from one individual pole to the next are very narrow in angular extent; cf. Federal Republic of Germany patent 23 46 380, the disclosure of which is incorporated herein by reference. In the upper, flat part 123 of rotor housing 18 there is provided a turned out (i.e., machined out) recess 124 which is coaxial with shaft 16 and accommodates an axially magnetized ring 125, e.g., made of rubber-magnetic material. This housing part 123 furthermore has at its center an axial extension 126 which, as can be seen, serves for centering an information-storage disk 127 (indicated in dash-dot lines), disk 127 being positively held in position by the magnetic pull of ring 125. Between the hub of rotor housing 18 and the inner ring of the upper ball bearing 14 there is accommodated a compensation washer or shim 60 which serves during assembly for establishing exactly the correct axial height for the rotor housing 18.

The stator plate packet 34 of the motor is located exteriorly of the carrier pipe 11 and has four salient poles (cf. FIG. 13). The four salient poles are defined, and separated from one another, by four equiangularly spaced cut-outs 132 in the stator plate packet 34, only one such cut-out 132 being visible in the sectional view of FIG. 7, at the right side thereof. The four cut-outs 132 accommodate a winding 38. Cast annular insulating members 134, 135 are provided to insulate the winding 38 from the stator plate packet 34. The circumferential course of the air gap may correspond to that disclosed in Federal Republic of Germany patent DBP 23 46 380, the disclosure of which is incorporated herein by reference.

In this embodiment, the radial flange 12 of the carrier pipe 11 is located beneath the stator plate packet 34. The upper face of flange 12 has, over a limited angular sector thereof, a recess 137 which accommodates a circle-sector-shaped circuit board or plate 138. Circuit board 138 carries, as shown, a galvanometric sensor 139 which is electrically connected to the two conductors of the stator winding 38, to which latter are connected connecting conductors 142, 143 which exit the motor through an aperture 144 of flange 12, as shown. The sensor may be used for generation of an rpm signal, a rotor-position signal, etc.

Shaft 16 has at its lower end an annular groove 145 which accommodates a circlip 146, the latter being spaced by a dish spring 147 and a shim disk 148 from the inner ring of bearing 15, the latter being shiftable on the shaft 16, so that the two ball bearings 14, 15 are held pressed together by spring force. In the embodiment of FIG. 7 the spring 18 of FIG. 1 is identically provided, although not illustrated in FIG. 7.

FIG. 8 depicts a fifth embodiment of the invention, namely a motor 104 in which the mounting flange 12 is provided at the upper end of the motor, whereas the rotor housing 181 is located below the mounting flange and is secured to the lower end of drive shaft 16. Located at the top of shaft 16 is a pan-shaped carrier member 150 having a recess 124 which accommodates an axially magnetized magnet ring 125. Carrier member 150 is positioned at a predetermined axial distance from the inner ring of the upper bearing 14 by means of a shim ring 60, the inner ring of bearing 14 being fixedly cemented to shaft 16, whereas the inner ring of lower bearing 15 is shiftable relative to shaft 16. Carrier member 150 accepts, as shown, an information-carrier disk 127. The face of magnet ring 125 facing the disk 127 is located lower, by an axial distance n, than the annular disk-bearing surface 71 of the carrier member 150. (It is to be noted that the same is true in the construction of FIG. 7, already described, where the magnet ring 125 is accommodated in a recess 124 on the upper face of rotor housing 180. Accordingly, in FIGS. 9 and 10 described below, where reference numeral 150 of FIG. 8 is indicated there is also indicated, therebelow in parentheses, reference numeral 180 of FIG. 7.)

In FIG. 8, rotor housing 181 has an axial extension 182 which accommodates the lower end of carrier pipe 11 and which is secured to the lower end of shaft 16. Located intermediate lower bearing 15 and the bottom of the rotor housing are a dish spring 47 and a shim ring 97. Dish spring 47 loads bearing 15 with a predetermined force and thereby holds bearings 14, 15 pressed together to an extent such as to ensure quiet running of the rotor.

In this embodiment the axial length of the stator plate packet 34 amounts to less than 50% of that of the rotor magnet 29. Accordingly, there is provided at the bottom face of stator plate packet 34 a skirted-rim annular member 35 having at its periphery an axially extending skirt 35'. Member 35 is shown in plan view in FIG. 3. The peripheral outline of member 35, clearly visible in FIG. 13, is substantially identical to and coincident with that of the stator plate packet 34; likewise, four equiangularly spaced cut-outs in member 35, apparent in FIG. 13, are identical to and coincident with four such cut-outs in the stator plate packet 34, formed to define four salient stator poles. As shown in FIG. 8, the axially extending skirt 35' of member 35 serves to lengthen the effective air gap 32, so that the latter extends over substantially the full axial length of rotor magnet 29. Thus, it is possible to increase the torque of motor 104, by air-gap-length increase, without increasing the total axial length of the stator of the motor.

Figure 5:
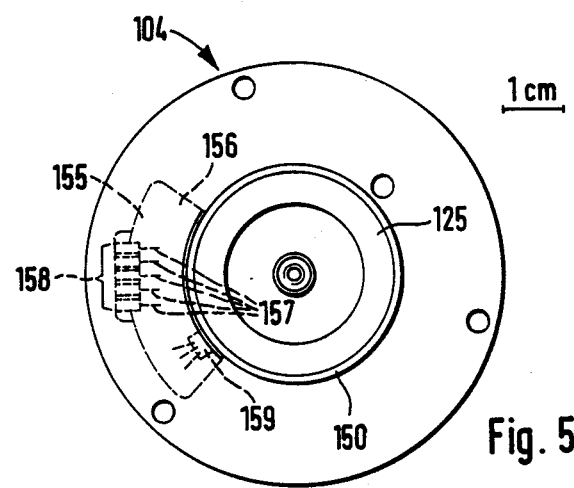
FIG. 5 is a plan view, seen from above, of the motor of FIG. 8, depicted at a typical true scale.

In the motor of FIG. 8, the underside of the mounting flange 12 has a recess 155, whose outline has the shape of a sector of a circle, as clearly seen in FIG. 5. Recess 155 accommodates a circuit plate 156 on which are secured connection terminals 158 for the stator winding 38, and connection terminals for a Hall-IC 159. The Hall-IC 59 is not visible in the section of FIG. 8, but extends into a marginal cut-out of the stator plate packet 34 in the same way as the Hall-IC 44 of FIG. 1. In the construction of FIG. 8, the peripheral outline of the stator plate packet 34, which determines the variation in the radial air-gap length as one proceeds circumferentially, serves to generate a reluctance torque component such as discussed earlier.

FIG. 5 depicts the motor of FIG. 8 at a typical true scale. The type of motor involved is a high-precision miniature motor having typically a power consumption of a few watts.

As shown in FIG. 8, the lower end 55 of shaft 16 is spherically rounded. During operation of the motor a (non-illustrated) spring contact bears against the rounded end 55 and serves to conduct away from shaft 16 electrostatic charge which might otherwise accumulate thereon.

The pan-shaped carrier member 150 of FIG. 8 (or the corresponding upper portion of rotor housing 180 in FIG. 7) is, in the simplest case, a deep-drawn part. The magnetic holding force MF exerted upon an information-storagae disk 127 laid upon the pan-shaped member 125 (or 180) depends upon the annular cross-sectional surface area of the ring-shaped surface 71 upon which the disk 127 rests. Assuming the magnetic flux be constant, the magnetic holding force MF decreases with dscreaing cross-sectional surface area of ring-shaped surface 71. If greater mechanical stability is required for the carrier member 150 (or 180), then it may be necessary to employ a lathe-turned member (similar to FIG. 7) or a deep-drawn member provided with auxiliary stamped portions 74 to increase rigidity. To optimize the magnetic holding force MF exerted upon an information-storage disk 127, the annular disk-bearing ridge 71 (see FIG. 9) of the pan-shaped carrier 150 is provided with an incline machined by turning; preferably the incline slopes radially inwards as shown in FIG. 9. The radial breadth b of this annular ridge as well as the inclination angle α determine the magnitude of the magnetic holding force MF, and also determine how quickly the holding force exerted upon the disk 127 collapses as the disk is removed from the disk-bearing surface 71. FIG. 11 depicts, for four different values of radial breadth b, the collapse of the magnetic holding force MF, as the distance h between the disk 127 and the disk-bearing surface 71 increases when the disk is lifted off surface 71. In FIG. 11, it is assumed that, in all four cases illustrated, no magnetic saturation is present at the disk-supporting surface 71, or more precisely at the surface through which pass the flux lines which are responsible for the holding force MF. However, the assumption that magnetic saturation is not present requires certain comments. In the mass-production of magnets, when the magnetic behavior exhibits a relatively wide tolerance range, there will be considerable differences in the magnitude of the holding force from one produced magnet to the next. Assume that the value of b is selected for the case of a magnet having a relatively low coercive force (remanent induction), i.e., at the low end of the tolerance range; accordingly, to ensure that such a magnet will provide a sufficient holding force, the value of b will be chosen relatively low, generally such that magnetic saturation will be approached but not quite reached. Now, if the same value of b were to be chosen in the case of another such magnet, whose coercive force however is at the high end of the tolerance range, such magnet will tend to produce saturation at the disk-bearing ridge 71. Thus, with this form of the disk-bearing ridge 71 it becomes possible at least in part to compensate for the tolerance range of the mass-produced magnets to be employed.

As the surface 71 will in general be produced within a very narrow tolerance range as to its axial height, and therefore in the assembled condition of the motor must be yet again machined down, the contour shown in FIG. 10 for the disk-bearing surface 71 is more disadvantageous, because then by means of the supplemental machining the ridge 71 is machined down by an amount Δh and nevertheless, if formed as in FIG. 10, does not undergo a change of cross-sectional area. If one desires a gradual collapse of the magnetic holding force MF with increasing distance h of the information-storage disk 127 from the carrier member 150, then the angle α must be made small; this is not compatible with the contour for ridge 71 shown in FIG. 10. If in the FIG. 10 case one selects the radial breadth b such that the disk-bearing ridge 71 actually saturates upon disk engagement, then this would result in a gradual collapse of the magnetic holding force MF upon disk removal, because then, as the disk 127 is removed a small distance h from the ridge 72, the magnetic flux in the ridge air gap will not immediately decrease in any drastic way, because there must first occur the return trip along the magnetic saturation curve of the material.

These properties of the ridge contour for the pan-shaped carrier member 150 which accommodates magnet 125 in FIG. 8 of course apply likewise to the construction of FIG. 7. Indeed, more generally, these are applicable, no matter what type of drive motor is employed, when a drive for an exchangeable information-storage disk is provided with a ring magnet 125 for holding the exchangeable disks in place on a ferromagnetic carrier; accordingly, the features in question are of inventive significance per se.

FIGS. 12 and 13 depict, on an enlarged scale, one of the skirted-rim members 35 (or equivalently, 36) discussed above, FIG. 12 being a section taken along line XII—XII of FIG. 13. As shown in FIG. 13, in correspondence to the cooperating stator plate packet, the skirted-rim member 35 has four equiangularly spaced cut-outs which define and separate four T-arms to form four salient poles. As shown in FIG. 12, the marginal skirt 35' (or 36') has an axial height H. In FIG. 13, arrow 75 indicates the direction of rotor rotation. The leading ends, as considered with regard to such direction, of the four T-arms have the initial portions of their marginal skirt 35' absent. These leading-end cut-outs A from the skirt 35' are best visualized from FIG. 12, where the removed material of the cut-out A is shown hatched by dash-dot lines. As indicated in FIG. 13, along an initial angular span E, the skirt 35' is entirely absent. Along the subsequent angular span F, the skirt 35' commences to reappear and return to its full axial height, the transition to its full height being for example a straight incline of angle $\gamma$ as shown in FIG. 12, or else a stepped transition, or else a transition along a curve. Along the entire subsequent angular span G the skirt 35' then runs substantially constant at its full axial height H. Preferably, the surface area of each cut-out A is 10–30% of the maximum surface area of the respective skirt segment 35' (or 36'), and the angular extent of sector E is about 8–15% and of sector F 5–20% of the angular extent of one of the four skirt segments 35'. These cut-outs A serve mainly to increase the auxiliary reluctance torque of the motor, to thereby improve and make more reliable the start-up action of the motor.

It will be noted from FIG. 13 that the peripheral outline of the skirted-rim member 35 (or 36) is here non-cylindrical. A concentric circle is shown in dash-dot lines for reference. As can be seen, the leading-end radius of each of the four T-arms is initially less than the maximum radius, increasing gradually thereto.

It is emphasized that the reluctance-torque effect produced by the cut-outs A can be employed likewise in the case where the outer periphery of the stator plate packet (and the corresponding outer periphery of such skirted-rim members) forms a constant-radial-breadth cylindrical air gap with the inner periphery of the rotor magnet arrangement. In such event, however, the cut-outs should generally be somewhat larger. Thus, if in FIG. 13 the member 35 (and likewise the stator plate packet) is of circular outline, the surface area of each cut-out A should be more on the order of 30–70% of the maximum surface area of the associated skirt segment 35'.

FIG. 14 depicts a sixth embodiment of the invention, in which the motor is of particularly short axial length. The rotor 28 is welded to the drive shaft 16 in the manner already described with regard to FIG. 1. The rounded end 55 of shaft 16 serves to conduct away static charge, as already described above. The bottom 77 of rotor 26 is provided with a series of concentric apertures 78, preferably seven spaced at equal angular intervals, of which only one is shown in FIG. 14. These apertures 78 serve for cooling and for noise reduction. To stiffen the pan-shaped rotor housing 28, 77 the bottom 77 thereof can be provided with (non-illustrated) radial ribs or creases extending intermediate neighboring apertures 78.

A further expedient serving to decrease axial length is the provision of the circuit board 79 in per se conventional film or foil form. The connecting conductors 46 which lead out from the circuit board to the exterior of the motor preferably have a thickness (on the order of about 0.1 mm) the same as that of the circuit board 79. Circuit board 79 is mounted directly to the underside of a mounting flange 76 (corresponding to mounting flange 12). Conventional arrangements employ a mounting flange in the form of a cast element consuming more axial length than the mounting flange 76 shown in FIG. 14, which is preferably a sheet metal stamping. To increase rigidity, flange 76 can be provided with ribs or creases 80, and furthermore be provided with a deep-drawn mounting rim 90 having mounting holes 91. The remaining components of the construction of FIG. 14 have already been described above, and need not be described again.

It will be understood that each of the elements described above, or two or more together, may also find a useful application in other types of motor constructions differing from the types described above.

While the invention has been illustrated and described as embodied in particular embodiments of brushless dc external-rotor motor units used for direct drive of an information-storage disk, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications that, from the viewpoint of prior art, fairly constitute essential characteristics of the generic or specific aspects of this invention.

What is claimed as new and desired to be protected by Letters Patent is set forth in the appended claims.

We claim:

1. A drive arrangement for signal processing devices, especially storage-disk devices, of the type including a motor whose rotor is used for direct-drive, the arrangement comprising:
a brushless dc motor comprising an internal stator and an external permanent-magnet rotor,
the stator comprising a carrier structure accommodating at least one roller bearing unit, the carrier structure being provided with a mounting portion for mounting the motor as a whole,
the rotor including a rotor shaft journalled within the roller bearing unit accommodated in the carrier structure, the rotor comprising a rotor magnet arrangement which is of predetermined axial length and has a general inner periphery,
the stator furthermore comprising a packet of stator plates radially outward of the carrier structure, the stator plate packet having two opposite axial end faces,
the stator plate packet having cut-outs forming salient poles and being provided with a stator winding to produce a periodic stator field,
the axial length of the stator plate packet being substantially smaller than the axial length of the rotor magnet arrangement,
the stator plate packet being provided at at least one of its axial end faces with at least one flux-conducting element having an overall peripheral outline which as viewed axially of the rotor is substantially the same as the peripheral outline of the stator plate packet,
the flux-conducting element having a peripheral skirt portion which extends generally parallel to the general inner periphery of the rotor magnet arrangement and is of substantially constant axial length along at least a substantial part of its circumferential extent,
the skirt portion forming with the rotor magnet arrangement a useful air gap which is a continuation of the air gap formed between the outer periphery of the stator plate packet and the inner periphery of the rotor magnet arrangement,
the skirted-rim flux-conducting element being provided with cut-outs in the skirt portion thereof, these cut-outs being located at least partly outside the angular intervals occupied, at the air gap, by the salient-pole-forming cut-outs of the stator plate packet, to thereby produce a reluctance torque component which during rotor rotation is shifted in time relative to the electromagnetic torque component resulting from said periodic stator field.

2. A drive arrangement as defined in claim 1,
the portions of the stator plate packet constituting the salient poles having leading ends and trailing ends considered with respect to the direction of rotor rotation,
the overall outline of the stator plate packet being generally circular and of constant radius
the skirt portion of the flux-conducting element consisting of a circumferential succession of skirt portion segments corresponding to successive salient pole portions,
the cut-outs of the flux-conducting element being cut-outs from the leading ends of the skirt portion segments thereof, each cut-out having a surface area equal to about 30–70% of the surface area which the respective skirt portion segment would have if the cut-out were not present.

3. A drive arrangement as defined in claim 1, wherein the peripheral skirt portion is of substantially constant axial length along at least the major part of its circumferential extent.

4. A drive arrangement as defined in claim 1, wherein the mounting portion of the carrier structure is a discrete flange member in the form of a sheet metal stamping connected to the remainder of the carrier structure.

5. A drive arrangement as defined in claim 1, the rotor comprising a rotor housing in the form of a deep-drawn sheet-steel cup- or pan-like member provided with cooling apertures.

6. A drive arrangement as defined in claim 1, the collectorless D.C. motor being provided on the stator thereof with a circuit or conductor plate element for motor control, the circuit or conductor plate element being in the form of a foil- or film-type circuit or conductor plate.

7. A drive arrangement as defined in claim 1, the rotor furthermore comprising a rotor housing in the form of a deep-drawn soft-magnetic member having a base portion at its end containing a central aperture, the rotor shaft having at its end a reduced-diameter portion received in the central aperture and at the region of the aperture connected by a laser-beam weld seam to the rim of the aperture.

8. A drive arrangement as defined in claim 5, the external rotor of the motor being located beneath the mounting portion.

9. A drive arrangement as defined in claim 1, the rotor magnet arrangement being magnetized in the radial direction considered relative to the rotor shaft and having a circumferential succession of poles, a plot of rotor magnet arrangement induction versus angular position along the circumferential direction of the rotor magnet arrangement having approximately the shape of a trapezoid-wave curve.

10. A drive arrangement as defined in claim 8, the cup- or pan-like member forming the rotor housing being of generally bell-shape and having a flat base portion extending radially of the rotor shaft, the apertures being distributed around the rotor shaft.

11. A drive arrangement as defined in claim 1, the rotor shaft having an end which projects axially out of the carrier structure, the rotor furthermore including a carrier member connected to the rotor shaft end and including a flat permanently magnetic holding magnet for holding an information-storage disk in place against the carrier member.

12. A drive arrangement as defined in claim 11, the carrier member being shaped to form a rotor housing for the rotor.

13. A drive arrangement as defined in claim 11, the carrier member having a support ridge of ferromagnetic material through which the flux of the flat holding magnet passes to support and hold an information-storage disk, the face of the flat holding magnet which faces towards an information-storage disk being axially recessed relative to the support ridge by a predetermined distance.

14. A drive arrangement as defined in claim 13, the rotor including a rotor housing having a larger-diameter portion surrounding the rotor magnet arrangement and, at the end of the rotor housing remote from the carrier member, a smaller-diameter portion which accommodates the at least one roller bearing unit.

15. A drive arrangement as defined in claim 13, the support ridge having an inclined flank portion.

16. A drive arrangement as defined in claim 13, the support ridge having a flank portion which evidences having undergone material removal by lathe turning such as to reduce the breadth of the support ridge.

17. A drive arrangement as defined in claim 1, said cut-outs in the skirt portion being located near the angular intervals occupied, at the air gap, by the salient-pole-forming cut-outs of the stator plate packet.

18. A drive arrangement for signal-processing devices, especially storage-disk devices, of the type including a motor whose rotor is used for direct-drive, the arrangement comprising:

a brushless dc motor comprising an internal stator and an external permanent-magnet rotor,
the stator comprising a carrier structure accommodating at least one roller bearing unit, the carrier structure being provided with a mounting portion for mounting the motor as a whole,
the rotor including a rotor shaft journalled within the roller bearing unit accommodated in the carrier structure, the rotor comprising a rotor magnet arrangement which is of predetermined axial length and has a general inner periphery,
the stator furthermore comprising a packet of stator plates radially outward of the carrier structure, the stator plate packet having two opposite axial end faces,
the stator plate packet having cut-outs forming salient poles and being provided with a stator winding to produce a periodic stator field,
the axial length of the stator plate packet being substantially smaller than the axial length of the rotor magnet arrangement,
the stator plate packet being provided at at least one of its axial end faces with at least one flux-conducting element having an overall peripheral outline which as viewed axially of the rotor is substantially the same as the peripheral outline of the stator plate packet,
the flux-conducting element having a peripheral skirt portion which extends generally parallel to the general inner periphery of the rotor magnet arrangement and is of substantially constant axial length along at least the major part of its circumferential extent, the skirt portion forming with the rotor magnet arrangement a useful air gap which is a continuation of the air gap formed between the outer periphery of the stator plate packet and the inner periphery of the rotor magnet arrangement, the skirted-rim flux-conducting element being provided with cut-outs in the regions of the cut-outs of the stator plate packet for generation of a reluctance torque component which during rotor rotation is shifted in time relative to the electromagnetic torque component resulting from said periodic stator field, the portions of the stator plate packet constituting the salient poles having leading ends and trailing ends considered with respect to the direction of rotor rotation, the overall outline of the stator plate packet being such that the leading end of each salient pole portion of the stator plate packet is initially of reduced radius and, proceeding circumferentially, is of increasing radius towards the trailing end of the salient pole portion, the skirt portion of the flux-conducting element consisting of a circumferential succession of skirt portion segments corresponding to the salient pole portions, the cut-outs of the flux-conducting elements being cut-outs from the leading ends of the skirt portion segments thereof, each cut-out having a surface area equal to about 10-30% of the surface area which the respective skirt portion segment would have if the cut-out were not present, the overall peripheral outline of the skirted-rim flux-conducting element corresponding to that of the stator plate packet and accordingly being of initially reduced radius at the portion thereof corresponding to the leading end of a salient pole and, proceeding circumferentially towards the trailing end, being of continuously increasing radius, the cut-outs from the skirt portion segments being so shaped that, at the leading end of a salient pole the skirt portion is entirely absent for a first predetermined circumferential extent, then for a second predetermined circumferential extent increases in axial length to a predetermined value, and then for the remainder of its circumferential extent has a substantially constant axial length substantially equal to the predetermined value.

19. A drive arrangement as defined in claim 18, the first predetermined circumferential extent being about 8-15% of the total circumferential extent of a skirt portion segment, the second predetermined circumferential extent being about 5-20% of the total circumferential extent of a skirt portion segment.

20. A drive arrangement for signal-processing devices, especially storage-disk devices, of the type including a motor whose rotor is used for direct-drive, the arrangement comprising:

a brushless dc motor comprising an internal stator and an external permanent-magnet rotor, the stator comprising a carrier structure accommodating at least one roller bearing unit, the carrier structure being provided with a mounting portion for mounting the motor as a whole, the rotor including a rotor shaft journalled within the roller bearing unit accommodated in the carrier structure, the rotor comprising a rotor magnet arrangement which is of predetermined axial length and has a general inner periphery, the stator furthermore comprising a packet of stator plates radially outward of the carrier structure, the stator plate packet having two opposite axial end faces, the stator plate packet having cut-outs forming salient poles and being provided with a stator winding to produce a periodic stator field, the axial length of the stator plate packet being substantially smaller than the axial length of the rotor magnet arrangement, the stator plate packet being provided at at least one of its axial end faces with at least one flux-conducting element having an overall peripheral outline which as viewed axially of the rotor is substantially the same as the peripheral outline of the stator plate packet, the flux-conducting element having a peripheral skirt portion which extends generally parallel to the general inner periphery of the rotor magnet arrangement and is of substantially constant axial length along at least the major part of its circumferential extent, the skirt portion forming with the rotor magnet arrangement a useful air gap which is a continuation of the air gap formed between the outer periphery of the stator plate packet and the inner periphery of the rotor magnet arrangement, the skirted-rim flux-conducting element being provided with cut-outs located at least partly outside the angular intervals occupied, at the air gap, by the salient-pole-forming cut-outs of the stator plate packet, to thereby produce a reluctance torque component which during rotor rotation is shifted in the relative to the electromagnetic torque component resulting from said periodic stator field.

21. A drive arrangement as defined in claim 20, wherein the peripheral skirt portion is of substantially constant axial length along at least the major part of its circumferential extent.

22. A drive arrangement as defined in claim 20, wherein the mounting portion of the carrier structure is a discrete flange member in the form of a sheet metal stamping connected to the remainder of the carrier structure.

23. A drive arrangement as defined in claim 20, the rotor comprising a rotor housing in the form of a deep-drawn sheet-steel cup- or pan-like member provided with cooling apertures.

24. A drive arrangement as defined in claim 20, the collectorless D.C. motor being provided on the stator thereof with a circuit or conductor plate element for motor control, the circuit or conductor plate element being in the form of a foil- or film-type circuit or conductor plate.

25. A drive arrangement as defined in claim 20, the rotor furthermore comprising a rotor housing in the form of a deep-drawn soft-magnetic member having a base portion at its end containing a central aperture, the rotor shaft having at its end a reduced-diameter portion received in the central aperture and at the region of the aperture connected by a laser-beam weld seam to the rim of the aperture.

26. A drive arrangement as defined in claim 23, the external rotor of the motor being located beneath the mounting portion.

27. A drive arrangement as defined in claim 20, the rotor magnet arrangement being magnetized in the radial direction considered relative to the rotor shaft and having a circumferential succession of poles, a plot of rotor magnet arrangement induction versus angular position along the circumferential direction of the rotor magnet arrangement having approximately the shape of a trapezoid-wave curve.

28. A drive arrangement as defined in claim 20,
the portions of the stator plate packet constituting the salient poles having leading ends and trailing ends considered with respect to the direction of rotor rotation,
the overall outline of the stator plate packet being such that the leading end of each salient pole portion of the stator plate packet is initially of reduced radius and, proceeding circumferentially, is of increasing radius towards the trailing end of the salient pole portion,
the skirt portion of the flux-conducting element consisting of a circumferential succession of skirt portion segments corresponding to the salient pole portions,
the cut-outs of the flux-conducting element being cut-outs from the leading ends of the skirt portion segments thereof, each cut-out having a surface area equal to about 10–30% of the surface area which the respective skirt portion segment would have if the cut-out were not present.

29. A drive arrangement as defined in claim 20,
the portions of the stator plate packet constituting the salient poles having leading ends and trailing ends considered with respect to the direction of rotor rotation,
the overall outline of the stator plate packet being generally circular and of constant radius,
the skirt portion of the flux-conducting element consisting of a circumferential succession of skirt portion segments corresponding to successive salient pole portions,
the cut-outs of the flux-conducting element being cut-outs from the leading ends of the skirt portion segments thereof, each cut-out having a surface area equal to about 30–70% of the surface area which the respective skirt portion segment would have if the cut-out were not present.

30. A drive arrangement as defined in claim 26, the cup- or pan-like member forming the rotor housing being of generally bell-shape and having a flat base portion extending radially of the rotor shaft, the apertures being distributed around the rotor shaft.

31. A drive arrangement as defined in claim 20, the rotor shaft having an end which projects axially out of the carrier structure, the rotor furthermore including a carrier member connected to the rotor shaft end and including a flat permanently magnetic holding magnet for holding an information-storage disk in place against the carrier member.

32. A drive arrangement as defined in claim 31, the carrier member being shaped to form a rotor housing for the rotor.

33. A drive arrangement as defined in claim 31, the carrier member having a support ridge of ferromagnetic material through which the flux of the flat holding magnet passes to support and hold an information-storage disk, the face of the flat holding magnet which faces towards an information-storage disk being axially recessed relative to the support ridge by a predetermined distance.

34. A drive arrangement as defined in claim 31, the rotor including a rotor housing having a larger-diameter portion surrounding the rotor magnet arrangement and, at the end of the rotor housing remote from the carrier member, a smaller-diameter portion which accommodates the at least one roller bearing unit.

35. A drive arrangement as defined in claim 31, the support ridge having an inclined flank-portion.

36. A drive arrangement as defined in claim 31, the support ridge having a flank portion which evidences having undergone material removal by lathe turning such as to reduce the breadth of the support ridge.

37. A drive arrangement as defined in claim 20, said reluctance-torque-producing cut-outs being located near the angular intervals occupied, at the air gap, by the salient-pole-forming cut-outs of the stator plate packet.

* * * * *